(12) United States Patent
Schieweck et al.

(10) Patent No.: US 10,203,045 B2
(45) Date of Patent: Feb. 12, 2019

(54) SWITCH VALVE WITH IMPACT DAMPING

(71) Applicant: Rausch & Pausch GmbH, Selb (DE)

(72) Inventors: Werner Schieweck, Thierstein (DE); Herwig Greiner, Neuenmarkt (DE); Christoph Zeug, Erlangen (DE)

(73) Assignee: Rausch & Pausch GmbH, Selb (DE)

( * ) Notice: Subject to any disclaimer, the term of this patent is extended or adjusted under 35 U.S.C. 154(b) by 0 days.

(21) Appl. No.: 15/789,134

(22) Filed: Oct. 20, 2017

(65) Prior Publication Data

US 2018/0112793 A1 Apr. 26, 2018

(30) Foreign Application Priority Data

Oct. 20, 2016 (DE) .................... 10 2016 119 990

(51) Int. Cl.
*F16K 31/06* (2006.01)
*F16K 47/04* (2006.01)
(Continued)

(52) U.S. Cl.
CPC .......... *F16K 31/0689* (2013.01); *B60T 8/365* (2013.01); *F16F 9/34* (2013.01);
(Continued)

(58) Field of Classification Search
CPC .... F16K 1/46; F16K 31/0655; F16K 31/0686; F16K 31/0689; F16K 47/04; F16F 9/466; F16F 9/469
(Continued)

(56) References Cited

U.S. PATENT DOCUMENTS 3,326,511 A * 6/1967 Hallgreen ........... F16K 31/0689
  251/129.15
5,467,962 A * 11/1995 Bircann ................. F02M 26/53
  251/129.15
(Continued)

FOREIGN PATENT DOCUMENTS

DE   195 27 482 A1   2/1996
DE   199 07 732 A1   8/2000
(Continued)

OTHER PUBLICATIONS

European Search Report dated Mar. 14, 2018, in connection with corresponding EP Application No. 17196852.2 (8 8 pgs.).
(Continued)

*Primary Examiner* — Matthew W Jellet
(74) *Attorney, Agent, or Firm* — Maier & Maier, PLLC

(57) ABSTRACT

An electrically or electromagnetically operated valve has a movable structural group with a magnetic armature, which is movable along an axis between a first and a second position to open or close the valve. The valve has a valve sleeve in which the magnetic armature is movable between the first and the second position, the magnetic armature defining on its axial sides two volumes in the valve sleeve. There is provided a throttling element elastic in the radial direction, which is arranged between the first volume and the second volume such that upon axial movement of the movable structural group it throttles an air stream between the first volume and the second volume in order to decelerate a movement of the movable structural group.

8 Claims, 4 Drawing Sheets

(51) Int. Cl.
*F16K 1/46* (2006.01)
*F16F 9/34* (2006.01)
*B60T 8/36* (2006.01)
*H01F 7/08* (2006.01)
*F16F 9/46* (2006.01)
*F16F 9/50* (2006.01)

(52) U.S. Cl.
CPC ............ *F16K 1/46* (2013.01); *F16K 31/0655* (2013.01); *F16K 31/0686* (2013.01); *F16K 31/0696* (2013.01); *F16K 47/04* (2013.01); *H01F 7/08* (2013.01); *F16F 9/466* (2013.01); *F16F 9/469* (2013.01); *F16F 9/50* (2013.01)

(58) Field of Classification Search
USPC ......... 251/54, 129.15; 277/544.567; 335/262
See application file for complete search history.

(56) References Cited

U.S. PATENT DOCUMENTS

| 5,722,633 | A | * | 3/1998 | Goossens | B60T 8/363 |
| | | | | | 251/129.15 |
| 7,040,594 | B2 | * | 5/2006 | Hironaka | B60T 8/363 |
| | | | | | 251/129.07 |
| 7,198,275 | B2 | * | 4/2007 | Gravier | F16J 15/3236 |
| | | | | | 277/438 |
| 7,434,780 | B2 | * | 10/2008 | Hayashi | F16K 31/1221 |
| | | | | | 251/12 |
| 7,543,795 | B2 | * | 6/2009 | Hess | F16K 31/0655 |
| | | | | | 251/129.15 |
| 8,387,946 | B2 | * | 3/2013 | Itoafa | F16K 31/0693 |
| | | | | | 251/129.02 |
| 2004/0041112 | A1 | * | 3/2004 | Goossens | B60T 8/363 |
| | | | | | 251/129.07 |
| 2005/0001183 | A1 | | 1/2005 | Hironaka | |

FOREIGN PATENT DOCUMENTS

| DE | 10 2005 044 672 A1 | 3/2007 |
| DE | 10 2010 038 900 A1 | 2/2012 |
| DE | 10 2010 044 442 A1 | 3/2012 |
| DE | 102011078102 A1 | 12/2012 |
| DE | 10 2015 100 182 A1 | 7/2016 |

OTHER PUBLICATIONS

German Office Action dated Mar. 16, 2018, in connection with corresponding DE Application No. 10 2016 119 990.7 (10 pgs.).

* cited by examiner

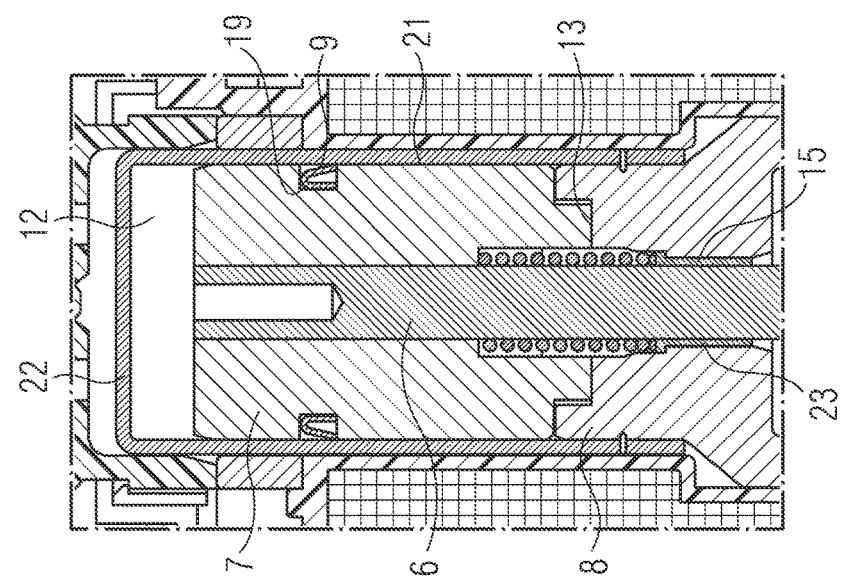
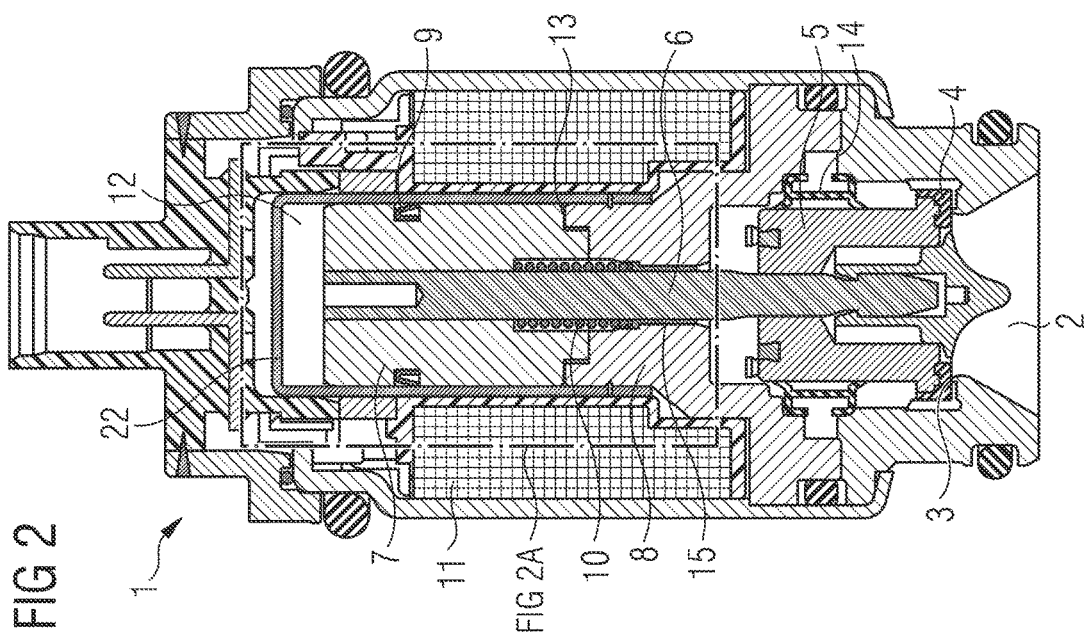

SWITCH VALVE WITH IMPACT DAMPING

FIELD OF THE INVENTION

The present invention relates to an electrically or electromagnetically operated valve, in particular for application in air suspension systems of automobiles.

BACKGROUND OF THE INVENTION

Electrically or electromagnetically operated switch valves comprise, inter alia, the components described hereinbelow in more detail. Such a valve comprises in particular a movable structural group with a magnetic armature which is movable along an axis in a valve sleeve, whereby in a first position at least one flow is released which is blocked in the second position. For this, the magnetic armature is coupled to a sealing element which co-operates with a valve seat. The magnetic armature is moved by energizing a coil which surrounds the valve sleeve.

Valves of the above-mentioned kind are used for a great variety of purposes. They are used for example in different ways and for different functions in air suspension systems of automobiles. For example, there are valves for filling and emptying the air spring bellows, valves for connecting or disconnecting accumulators in the system, as well as valves via which the bellows volumes can be connected to additional volume as needed. Preferably, such valves are operated electromagnetically, as is the seat valve described in DE 10 2011 078 102 A1.

The dynamic behavior of the automobile requires a short switching time which entails a high switching speed and impact speed of the movable components or sealing elements. Known valves were hence provided with damping elements which damp the impact of the movable components against the stationary parts. The seat valve described in DE 10 2011 078 102 A1 has, for example, such damping elements which damp an impact of the magnetic armature on a pole member. However, the switching operation of the valve is acoustically perceptible in spite of impact damping elements. Hitherto, this switching noise was concealed by engine noises of the internal combustion engine. This concealment is reduced, however, for example because at present immission control measures, like start-stop automatic system, hybrid drives or electric vehicles are implemented, for the reason of which the switching noise comes to the focus of attention and is audible to the vehicle passengers.

SUMMARY OF THE INVENTION

The object of the present invention is therefore to propose a valve which has a high cross section of flow with a fast switching time while it is acoustically unobtrusive.

This object is achieved according to the invention by an electrically or electromagnetically operated valve having the features of the disclosure.

The magnetic armature which is part of the movable structural group of the valve defines in the valve sleeve a first volume on a first axial side of the magnetic armature and a second volume on a second axial side of the magnetic armature opposing the first axial side. To damp the movement of the movable structural group, the valve comprises a throttling element elastic in the radial direction, which is arranged between the first and second volume such that upon axial movement of the movable structural group it throttles a fluid stream between the first and second volume.

By throttling the fluid stream between the two volumes in the valve sleeve by means of the throttling element, upon movement of the movable structural group in the volume arranged at the front, in the moving direction, there arises an overpressure which decelerates the movement in the corresponding direction. In particular when the magnetic armature is surrounded by air, the air in the corresponding volume is compressed. At the same time there arises a negative pressure in the volume arranged at the back, in the moving direction, which also contributes to the deceleration of the movable structural group. There arises a switching-path dependent deceleration of the movement, which slows down the impact speed of the magnetic armature or of other parts of the movable structural group against stationary parts of the valve and therefore a noise is reduced or avoided. On account of the throttling and compressing of the air, the movable structural group is strongly decelerated only by the end of the movement shortly before the impact, which increases the current required for moving the movable structural group only slightly. When the movable structural group stands still, preferably a pressure compensation between the two volumes is effected.

In a preferred configuration, the throttling element comprises at least one circumferential seal, such as a ring seal, in a gap between the magnetic armature and the valve sleeve. Preferably, the throttling element is included in the movable structural group, is arranged in particular along a circumference of the magnetic armature, for example in a circumferential groove in the magnetic armature. It is to be understood that the throttling element can be arranged alternatively or, where applicable, additionally also in the stationary part of the valve, in particular in the valve sleeve. There can also be provided several throttling elements which are arranged successively in axial direction on the circumference of the magnetic armature and/or in the valve sleeve.

Preferably, at least one passage is provided which upon axial movement of the movable structural group allows a fluid stream between the first and second volume. This is advantageous in particular when the throttling element comprises a seal, such as a circumferential ring seal, which mutually seals the first volume and the second volume and would substantially completely prevent a fluid stream, i.e. a pressure compensation between the two volumes. As the decelerating effect may possibly be too high in this case, it is advantageous to decrease the throttling effect by a corresponding passage. The passage is arranged preferably in the throttling element. It may comprise, for example, at least one slot in the circumferential seal which can also be advantageous for the assemblage of the throttling element on the circumference of the magnetic armature. Alternatively, there can also be provided several passages or differently configured passages or openings. Alternatively or additionally, at least one passage can also be provided in the magnetic armature, which connects the first and second volume with each other for pressure compensation. If at least one passage is configured in the magnetic armature, the seal can be circumferentially completely closed.

According to a preferred configuration, the throttling element is arranged and configured such that upon movement of the movable structural group in a first axial direction it develops a higher throttling effect than upon a movement of the movable structural group in a second axial direction opposing the first axial direction. The throttling effect in the second axial moving direction can be, for example, less than half, less than a third or also less than 10% of the throttling effect in the first moving direction. Preferably, upon a movement in the second axial direction the throttling element develops substantially no throttling effect. In particular, it is advantageous when the throttling element has a high throttling effect upon turn-on of the valve, i.e. upon energizing the coil, because the movable structural group is moved at a high speed in order to enable a short switching time. A noise caused by an undamped impact would hence be especially loud upon turn-on. On the contrary, upon turn-off of the valve, during which the movable structural group is moved, for example, by spring tension back in its starting position, a deceleration is not necessarily needed. Here, the throttling effect can be low or completely omitted.

The throttling element may comprise at least one sealing lip, for example a sealing lip with a V-profile which is open in an axial direction. Such a seal is also called a V-seal or V-ring. Advantageously, the V-profile of the sealing lip is aligned such that the sealing lip spreads open upon an axial movement of the movable structural group produced by energizing the valve, i.e. upon turn-on of the valve. In other words, spreading open the V-profile of the sealing lip achieves, upon turn-on of the valve, an enhanced throttling effect, which due to the above-mentioned reasons may be advantageous. Upon turn-off, however, the V-profile of the sealing lip may fold up, so that in this moving direction a lower or substantially no throttling effect is generated by the throttling element. It is to be understood that the term "V-profile" comprises in general profiles with at least two legs which permit spreading open the profile, such as for example also U-shaped profiles. Independently of its shape, the throttling element may comprise, for example, PTFE or other suitable plastic materials In a further configuration, the movable structural group may comprise a plunger which extends in the axial direction from the second axial side of the magnetic armature and through a bore in a stationary part of the valve. In the bore there may be arranged a seal which seals the second volume. The second axial side may here be in particular the side of the magnetic armature which upon turn-on of the valve lies in the moving direction in the front, in other words, the side of the magnetic armature which limits the volume in which an overpressure is built up for decelerating the movement of the movable structural group, as described above. To enhance the build-up of overpressure and thus the throttling effect, it is of advantage to seal this volume. This seal may comprise, for example, a sealing sleeve in which the plunger is movably mounted. The sealing sleeve may be movably mounted in the bore. With the plunger it forms a very small gap, so that the desired throttling is achieved. It is to be understood that other seals are also possible which may be arranged in the bore and/or on the plunger, such as for example one or several ring seals.

According to a further configuration, the magnetic armature may comprise at least one recess on an axial side, the recess preferably occupying more than a third, further preferably more than half of a cross-sectional area of the magnetic armature. By providing such a recess, in other words a partial hollowing-out of the magnetic armature, the weight of the magnetic armature can be reduced, which contributes to decreasing the force of impact and thus the impact noise. Although the magnetic force is not strongly impaired by the recess in the magnetic armature, it may be advantageous to adapt the so-called pole stage, i.e. the geometry of the magnetic armature in the region in which the magnetic circuit passes from the stationary part of the valve on to the movable structural group, in particular the magnetic armature.

For further reducing the noise, damper elements can be provided in particular in the region of a stop of the magnetic armature, for example, damper elements as in the seat valve of DE 10 2011 078 102 A1.

The flow through the valve can have at one end at least one axial flow opening and at another end for example at least one radial flow opening, wherein the closing element in the second position effectuates a sealing of the at least one axial flow opening. Preferably, the valve is a seat valve, but the invention can advantageously also be applied to valves of a different kind, for example slide valves. A single or a plurality of the above-described valves can advantageously be used in an air suspension system of an automobile.

BRIEF DESCRIPTION OF THE DRAWINGS

Hereinafter the invention will be presented by way of example with reference to the attached drawings. Therein are shown.

DETAILED DESCRIPTION OF THE DRAWINGS

Figure 1A:
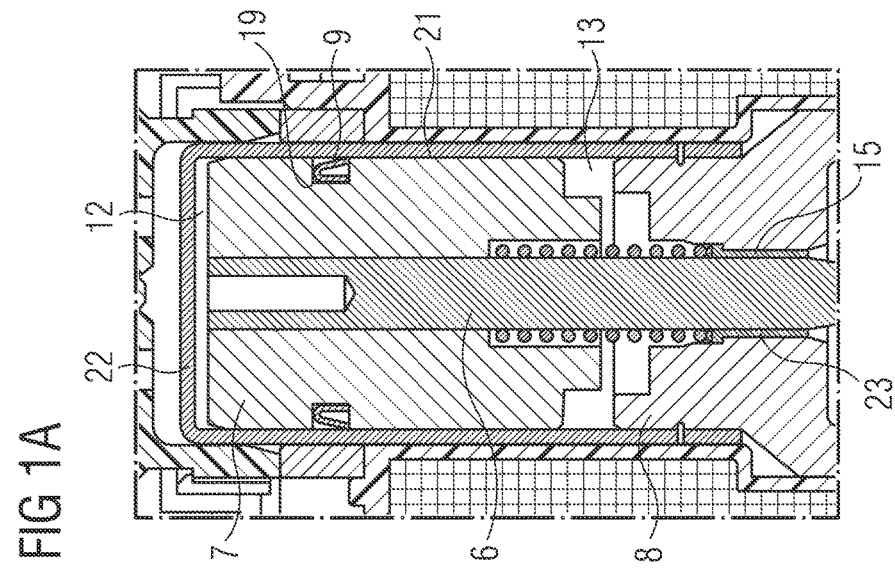
FIG. 1 an electromagnetically operated seat valve according to a preferred embodiment example in the open state,
FIG. 1A an enlarged detail of the valve of FIG. 1,
FIG. 2 the valve of FIG. 1 in the blocked state,
FIG. 2A again an enlarged detail of the valve of FIG. 2,
FIG. 3 a further embodiment example of a valve,
FIG. 4 yet a further embodiment example of a valve,
FIGS. 5A and 5B various views of a throttling element and
FIG. 6 a further embodiment example of a throttling element in cross section.
Figure 1:
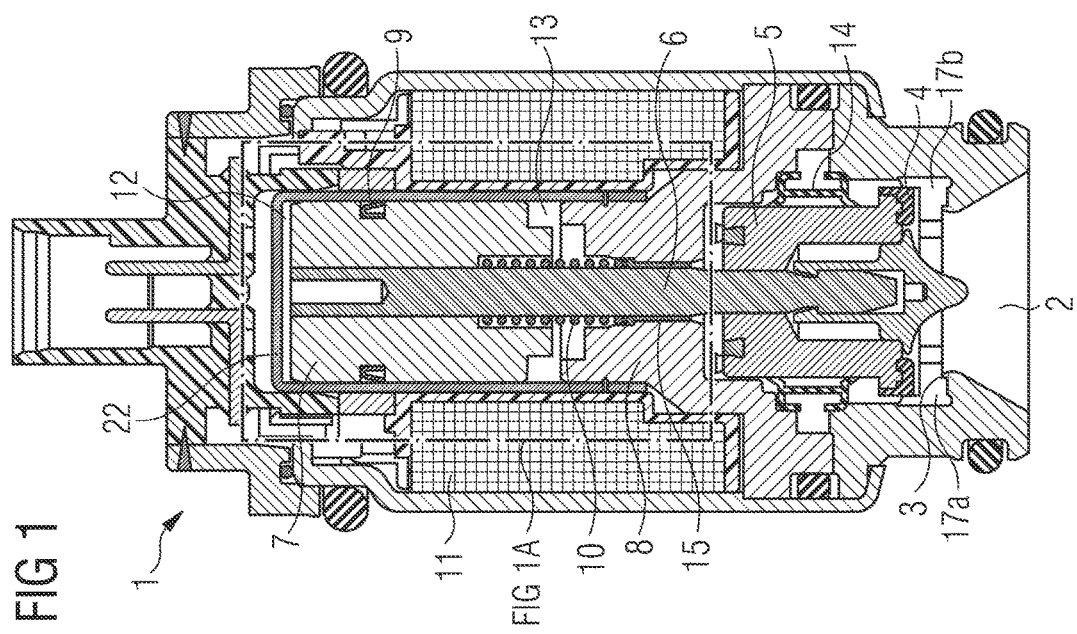

The switch valve 1 represented in the open state in FIG. 1 and in the blocked state in FIG. 2 possesses a valve opening 2 with a sealing seat 3 which is closable by a sealing element 4. Therefore, the valve 1 is configured as a seat valve. The sealing face of the sealing element 4 is elastically deformable in order to guarantee a reliable sealing of the axial flow opening 2. The sealing element 4 is seated at the front axial end of a valve element 5 which is coupled via a plunger 6 to a movable magnetic armature 7. It is in principle conceivable to fasten the sealing element 4 immediately to the magnetic armature 7. In the represented embodiment example, however, the valve element 5 is seated firmly on the plunger 6 which is in turn firmly seated in the magnetic armature 7. This results in a movable structural group consisting of sealing element 4, valve element 5, plunger 6 and magnetic armature 7. The valve element 5 and the plunger 6 or the magnetic armature 7 and the plunger 6 are here in particular pressed together. Upon assembling, this allows the length of the movable structural group and of the axial distance of the magnetic armature 7 to the pole member 8 to be adjusted. The valve element 5 is mounted to be sealed and axially displaceable by means of a dynamic seal 14. The plunger 6 runs through a bore 23 in the pole member 8.

The movable magnetic armature 7 is part of an iron circuit to which the stationary pole member 8 also belongs. The magnetic armature 7 is mounted axially displaceable in a valve sleeve 22, separated by a gap 21. Between the magnetic armature 7 and the pole member 8 is a volume 13 which enables the magnetic armature 7 to move axially toward the pole member 8 when the sealing element 4 is brought into its closed position represented in FIG. 2. On the axially opposite side of the magnetic armature 7 there is located a volume 12 which allows a movement of the magnetic armature 7 from the blocked state shown in FIG.

2 into the open state shown in FIG. 1. The volumes 12 and 13 are limited by the valve sleeve 22 and are connected with each other by the gap 21, so that upon an axial movement of the magnetic armature 7 air can be exchanged between the two volumes 12 and 13.

In the open switch position of the valve represented in FIG. 1, the magnetic armature 7 is held spaced from the pole member 8 through mechanical load by means of a spring element 10. Through electrical energizing of a coil 11 surrounding the magnetic armature 7 and the pole member 8, a magnetic circuit penetrating the magnetic armature 7 and the pole member 8 is generated in such a way that between the pole member 8 and the magnetic armature 7 there acts a magnetic attraction which counteracts the mechanical load of the spring element 10 and overcomes it. Then the magnetic armature 7 moves towards the pole member 8, so that the plunger 6 is axially displaced and the sealing element 4 closes the sealing seat 3, so that in the blocked state the flow between radial flow openings 17a, 17b and the axial flow opening 2 is prevented.

In order to achieve a short switching time in particular upon closing the valve, the movable structural group is moved with a high speed. An undamped impact of the sealing element 4 on the sealing seat 3 would generate a disturbing noise, which cannot be completely avoided even with damper elements (not shown) for example between the magnetic armature 7 and the pole member 8. Between the pole member 8 and the magnetic armature 7 there is usually retained a minimum of the volume 13 in the form of an air gap (so-called remanence gap), so that at this point an impact noise can be prevented. In addition, the air gap increases the current at which the valve 1 opens, thereby reducing the turn-off time. Short switching times in connection with high flow rates are desired in particular when the valve 1 is employed in an air suspension system of an automobile.

Figure 5A:
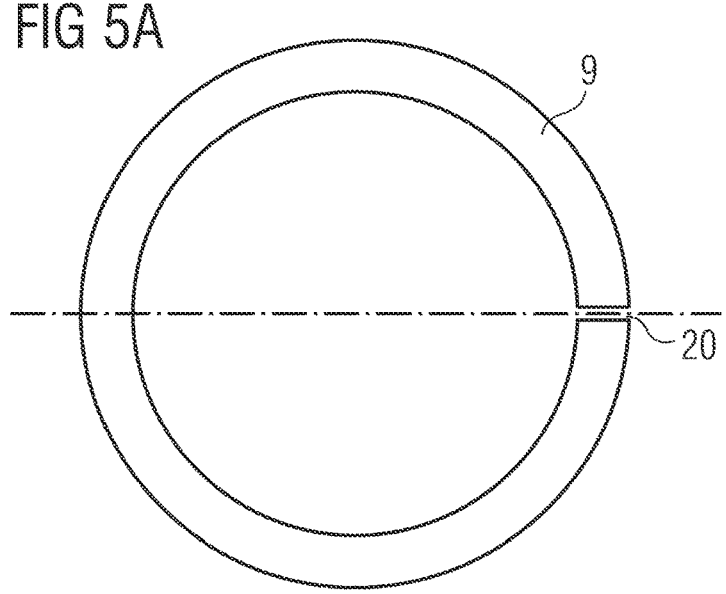
Figure 5B:
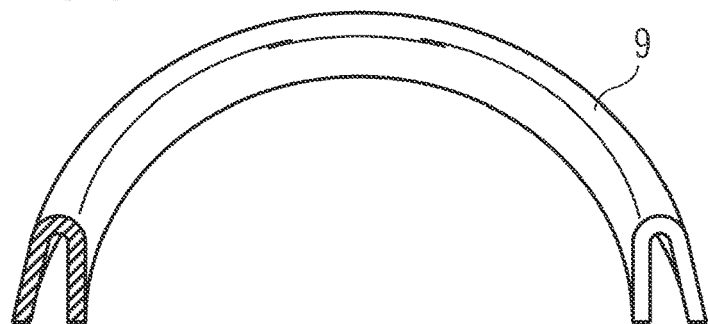

In the valve 1 the movement of the movable structural group is therefore decelerated and thus the impact of the sealing element 4 on the sealing seat 3 is weakened. For this, a throttling element 9 is provided which throttles the exchange of air between the two volumes 12 and 13. The throttling element 9 is configured in particular as a V-seal, i.e. a sealing ring with a V-profile, as represented in FIG. 5A in plan view and in FIG. 5B in a perspective sectional drawing (section along the dashed line in FIG. 5A). Upon energizing the coil 11, i.e. upon turn-on of the valve 1, the magnetic armature 7 is moved in the direction of the pole member 8 against the force of the spring 10.

With the movement of the movable structural group the volume 13 is reduced and air contained therein is compressed (overpressure) and at the same time the volume 12 increases and air contained therein expands (negative pressure). This leads to a deceleration of the magnetic armature 7. More precisely, this leads to a switching-path dependent deceleration, because the resistance by the compressed air is small at the beginning of the movement and only by the end of the movement shortly before the impact it causes a strong deceleration. In this way, an effective reduction of the impact noise with an at the same time insignificant increase of the necessary driving current is achieved. When the movable structural group stands still, a pressure compensation between the volumes 12 and 13 takes place.

For achieving a sufficient compression of the air contained in the volume 13 and preventing the air from escaping through the bore 23 along the plunger 6, the volume 13 is sealed in the region of the plunger 6. For this, a sealing sleeve 15 is inserted in the bore 23. The sealing sleeve 15 reduces the gap between the plunger 6 and the pole member 8 in the bore 23. The arising small gap between the sealing sleeve 15 and the plunger 6 improves the throttling and deceleration of the movable structural group, because the volume 13 then is sealed on both sides.

Upon turn-on of the valve 1, the throttling element 9 ensures that an exchange of air from the volume 13 in the direction of the volume 12 is throttled. Through the alignment of the V-profile, i.e. the opening of the V-profile in the direction of the volume 13, an elastic deformation of the throttling element 9 occurs radially outwardly such that upon an axial movement of the magnetic armature 7 in the direction of the pole member 8 the V-profile spreads open and comes to lie against the internal wall of the valve sleeve 22. This enhances the sealing effect.

Figure 6:
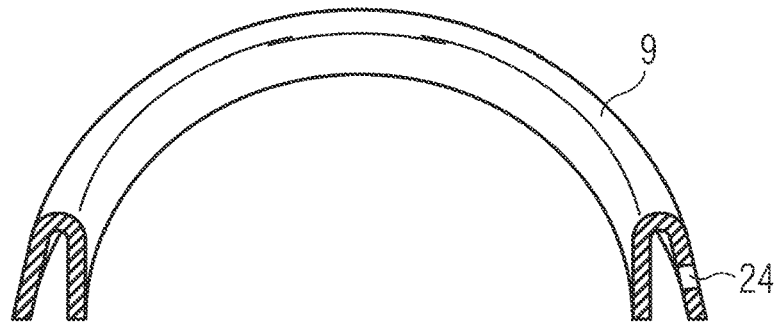

To decrease the throttling effect, i.e. to increase the flow of air through the throttling element 9, the throttling element 9 has a slot 20 (FIG. 5A). At the same time the slot 20 permits an easy assemblage of the otherwise annular throttling element 9 in the groove 19 of the magnetic armature 7. There can also be provided several slots and/or one or several other through openings in the throttling element 9 or also in the magnetic armature 7 and/or the plunger 6, which allow an exchange of air between the two volumes 12 and 13. By way of example, in FIG. 6 there is represented a throttling element 9 with a hole 24 instead of a slot, which extends through the throttling element 9 to allow an exchange of air through the throttling element 9. By providing a slot 20 or any other through opening 24 the throttling effect and thus the deceleration of the movable structural group can be adjusted.

In the opposite moving direction, i.e. upon turn-off of the valve 1, whereby the movable structural group is moved into the position shown in FIG. 1 by means of the force of the spring 10, the V-profile of the throttling element 9 is squeezed, so that a throttling effect is produced which is reduced compared to the turn-on or no throttling effect is produced. On account of the lower speed of movement of the movable structural group, upon turn-off a deceleration is not necessarily required.

Figure 3:
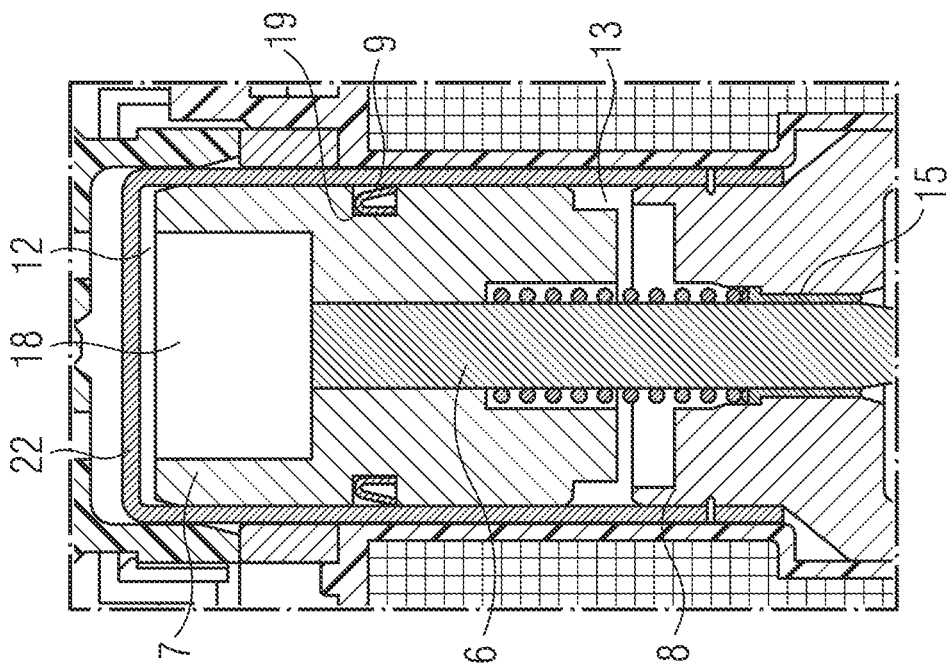

In FIG. 3 there is shown another embodiment example of a valve 1 which is substantially similar to the above-described valve 1. To facilitate the assemblage of the sealing ring 9, the magnetic armature 7 is configured in two-part fashion, however. After insertion of the sealing ring 9 an annular component 16 is connected with the body of the magnetic armature 7, thereby closing the groove open in axial direction 19. A cutting of the sealing ring 9 can thus be omitted. For the above-mentioned reasons with respect to the throttling effect, providing a slot 20 or other passage connecting the two volumes 12 and 13 with each other may nevertheless be advantageous, however.

Figure 4:
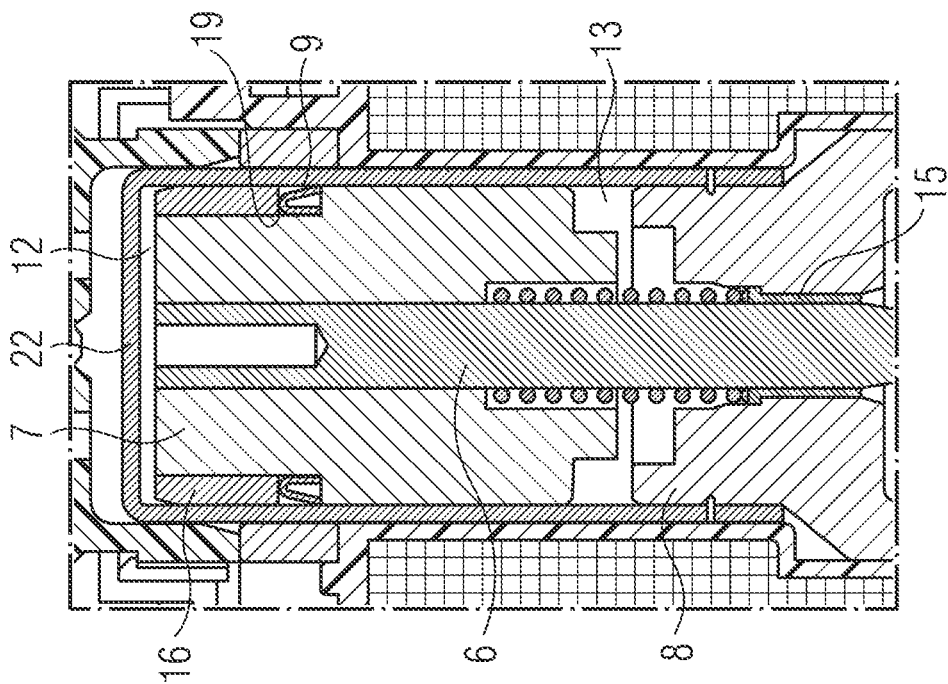

In FIG. 4 there is shown yet another embodiment example of a valve 1 which likewise is substantially similar to the above-described valve. In contrast to the valve 1 described above, the magnetic armature 7 of the valve 1 from FIG. 4 has a recess 18. This can be provided, because in this region of the magnetic armature 7 hardly any magnetic flux is present. For compensating the magnetic curve in comparison to a magnetic armature without this recess, the pole stage, i.e. the geometry at the end of the magnetic armature 7 facing the pole member 8, is adapted. The recess 18 reduces the weight of the magnetic armature 7 which further contributes to a reduction of the force of impact of the magnetic armature 7 on the pole member 8 upon turn-on of the valve 1 and therefore to a reduction of noise.

The invention claimed is:

1. An electrically or electromagnetically operated valve, comprising
    a movable structural group with a magnetic armature, which is movable along an axis between a first and a second position, wherein in the first position at least one passage through the valve is at least partially open, wherein the at least one passage is closed in the second position,
    a valve sleeve which surrounds the magnetic armature and in which the magnetic armature is movable between the first and the second position, wherein the magnetic armature defines in the valve sleeve a first volume on a first axial side of the magnetic armature and a second volume on a second axial side of the magnetic armature opposing the first axial side, and
    a throttling element elastic in a radial direction, which is arranged between the first volume and the second volume such that upon axial movement of the movable structural group it throttles a fluid stream between the first volume and the second volume;
    wherein the movable structural group comprises a plunger which extends in the axial direction from the second axial side of the magnetic armature and through a bore in a stationary part of the valve, wherein in the bore there is arranged a seal which seals the second volume.

2. The valve according to claim 1, wherein the throttling element further comprises at least one circumferential seal in a gap between the magnetic armature and the valve sleeve, wherein the throttling element is arranged along a circumference of the magnetic armature.

3. The valve according to claim 1, wherein at least one passage is provided which upon axial movement of the movable structural group allows a fluid stream between the first and second volume, wherein the passage is arranged in the throttling element.

4. The valve according to claim 1, wherein the throttling element is configured such that upon movement of the movable structural group in a first axial direction it develops a higher throttling effect than upon a movement of the movable structural group in a second axial direction opposing the first axial direction, wherein the throttling element upon a movement in the second axial direction develops substantially no throttling effect.

5. The valve according to claim 1, wherein the throttling element further comprises at least one sealing lip, wherein the at least one sealing lip has preferably a V-profile which is open in an axial direction.

6. The valve according to claim 5, wherein the sealing lip is arranged such that it spreads open upon an axial movement of the movable structural group produced by energizing the valve.

7. The valve according to claim 1, wherein the seal further comprises a sealing sleeve in which the plunger is mounted to be axially movable.

8. The valve according to claim 1, wherein the magnetic armature further comprises at least one recess on an axial side, wherein the recess occupies more than a third, of a cross-sectional area of the magnetic armature.

* * * * *